(12) United States Patent
Bouguen et al.

(10) Patent No.: US 8,417,250 B2
(45) Date of Patent: Apr. 9, 2013

(54) CONTROL OF RADIO CELL ACTIVITY

(75) Inventors: Yannick Bouguen, Marseilles (FR);
François-Xavier Wolff, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/864,679

(22) PCT Filed: Jan. 19, 2009

(86) PCT No.: PCT/FR2009/050066
§ 371 (c)(1),
(2), (4) Date: Jul. 27, 2010

(87) PCT Pub. No.: WO2009/095576
PCT Pub. Date: Aug. 6, 2009

(65) Prior Publication Data
US 2010/0311427 A1 Dec. 9, 2010

(30) Foreign Application Priority Data

Feb. 1, 2008 (FR) ...................................... 08 50658

(51) Int. Cl.
*H04W 36/14* (2009.01)
(52) U.S. Cl. .......................... 455/444; 455/446; 455/466
(58) Field of Classification Search .................. 455/446, 455/456.5, 444, 466, 436, 438
See application file for complete search history.

(56) References Cited

U.S. PATENT DOCUMENTS

| 7,142,861 | B2 * | 11/2006 | Murai | 455/444 |
|---|---|---|---|---|
| 8,311,005 | B2 * | 11/2012 | Sundaresan et al. | 370/329 |
| 2006/0217121 | A1 * | 9/2006 | Soliman et al. | 455/446 |
| 2007/0066273 | A1 * | 3/2007 | Laroia et al. | 455/343.2 |
| 2007/0097939 | A1 | 5/2007 | Nylander et al. | |
| 2011/0014921 | A1 * | 1/2011 | Neil | 455/444 |
| 2012/0129536 | A1 * | 5/2012 | Zou et al. | 455/444 |

FOREIGN PATENT DOCUMENTS

WO  WO 2007/136339 A2  11/2007
WO  WO 2008/131588  *  6/2008

* cited by examiner

*Primary Examiner* — Cong Tran
(74) *Attorney, Agent, or Firm* — Drinker Biddle & Reath LLP

(57) ABSTRACT

A cellular network includes a first cell management entity adapted for managing a first radio cell that can be in an active or inactive state, a second cell management entity adapted for managing at least a second radio cell, and at least one control entity adapted for controlling the first cell management entity, wherein said first and second radio cells at least partially overlap each other geographically. At the control entity, a piece of presence information is obtained concerning the presence of at least one terminal in a radio neighboring area of the first cell. An activity state of the first cell is then decided on the basis of the piece of presence information, the radio neighboring area of the first cell including at least the second cell.

15 Claims, 3 Drawing Sheets

CONTROL OF RADIO CELL ACTIVITY

CROSS-REFERENCE TO RELATED APPLICATIONS

This application is the U.S. national phase of the International Patent Application No. PCT/FR2009/050066 filed Jan. 19, 2009, which claims the benefit of French Application No. 08 50658 filed Feb. 1, 2008, the entire content of which is incorporated herein by reference.

FIELD OF THE INVENTION

The present invention relates to cellular networks, and more particularly the control of the activity of certain cells in a cellular network, in particular when the cellular network in question includes conventional cells and cells of the "restricted access" type.

BACKGROUND

A "restricted access cell" corresponds to a radio cell which is generally located so as to cover a private or semi-private place such as a business or also a place of residence such as an apartment or a building.

It can be advantageous to provide for the installation of such cells in order to offer a radio access with improved performance to a restricted user group subscribed to this access. Thus it can be envisaged to offer a restricted radio access to a family subscribed to such a service and in whose apartment a base station is situated, specifically adapted to cover the place of residence of this family. Many other scenarios can also be envisaged in the use of such specific base stations making it possible to offer a restricted-radio access cell.

Owing to the fact that access to such cells is restricted, the subscribers to a cell of this type can have very good quality radio access, with high transmission throughputs. They can therefore benefit from telecommunications services which would be more difficult for them to access via a conventional cellular network covering said same place.

Such a restricted access cell can correspond to a femto cell, i.e. a radio cell which is smaller than a conventional cell provided in a conventional cellular telecommunications network, such as for example a cellular network of the GSM (Global System for Mobile communication) or also UMTS (Universal Mobile Telecommunication System) type. The installation of such small radio cells makes it possible in certain cases to improve the radio coverage provided by conventional cellular networks.

In order to provide such a restricted access cell, provision is made to install an adapted base station, hereinafter referred to by the name "cell management entity".

It should be noted that a cell management entity can be installed independently of other cell management entities, the purpose intended being to provide radio coverage adapted to the residents of the place in question. Thus, unlike other cellular telecommunications networks providing continuous radio cover over a large territory, such as a national territory, the installation of these cell management entities can correspond to an uncoordinated roll-out of the various managed restricted-access cells, since the radio coverage attached to such a cell management entity can be managed autonomously with respect to the radio coverage attached to a neighbouring cell management entity. The features of a conventional cellular telecommunications network cannot therefore easily be applied to a restricted access cell.

It should be noted that today there are objections to high electricity consumption of gateway equipment (Home Gateway) used in cellular communications networks to provide a DSL (Digital Subscriber Line) type service to subscribers.

For similar reasons, the mass roll-out of restricted access cells risks leading to a highly undesirable electricity consumption. In fact, it is highly probable that subscribers have a regrettable tendency not to power-off their cell management entity when they leave the place covered thereby.

Moreover, a mass roll-out of such restricted access cells can cause unwanted interference on the radio cells of a mobile cellular network that are close to restricted access cells. Moreover, the cell management entity in charge of a restricted access cell can be in communication with a cellular network entity and this communication then uses communications resources which can severely affect the overall communications resources of such a cellular network.

It is very likely that the number of cell management entities deployed in an uncoordinated manner is a very high number (of the order of a million at least, for a country such as France). Thus the aforementioned negative effects that can be caused by the roll-out of such restricted access cells could have a very significant impact.

The purpose of the present invention is to improve the situation.

SUMMARY

A first aspect of the present invention proposes a method of control in a cellular network including:
- a first cell management entity adapted for managing a first radio cell which can be in an active state or in an inactive state;
- a second cell management entity adapted for managing at least one second radio cell; and
- at least one control entity adapted for controlling the first cell management entity;

said first and second radio cells overlapping each other geographically at least partially;
said method including the following steps at the control entity:
/1/ obtaining a piece of presence information relating to the presence of at least one terminal in a radio neighbouring area of the first cell;
/2/ deciding an activity state of the first cell on the basis of said piece of presence information;
said radio neighbouring area of the first cell including at least the second cell.

No limitation is attached to the type of terminal for which a method according to an embodiment of the present invention is adapted. Such a terminal can in particular be a mobile terminal.

In such a cellular network, it is possible to provide to a terminal in a given location, such as for example in its residential building, both a radio coverage originating from a conventional cellular network such as an LTE (Long Term Evolution) network in the process of specification within the 3GPP (3rd Generation Partnership Project) group, to which the second radio cell belongs, and another radio coverage, originating from a cell management entity allowing it for example to establish communications of better quality and/or with high throughputs, without any capacity problems, and therefore allowing it to access other communications services.

No limitation with respect to the size of the first cell is attached to the present invention. In fact, the first cell can in particular be a femto cell or also a macro cell.

This network architecture is advantageously used in the case where the first cell is a cell having access restricted to subscribers. For example, it can be envisaged that this first cell is a cell provided by a cell management entity dedicated to the specific radio coverage of an apartment or a private residence. In these conditions, it can be provided that only a restricted subscriber group can make use of the access to this cell. This feature is significant inasmuch as it allows this restricted subscriber group to benefit from a good-quality radio access.

In such an architecture, provision is made to reduce the various impacts that the first cell can have on the environment, by limiting the electricity consumption of the first cell management entity and the impacts on the network to which the second cell belongs by limiting the interference between the first and second cells. These impacts are limited since the features stated above make it possible to limit the activity of the first cell to the periods during which at least one of the subscribers having authorized access thereto are in the immediate radio neighbouring area of this first cell.

Moreover, the at least partial overlapping of a geographical area in which cover is duplicated, both by the coverage of the first cell and by that of the second cell, advantageously makes it possible to use the second cell for detecting the presence of a terminal in this area. Thus, when a subscriber terminal is powered-up in the geographical area in which cover is duplicated, and the first cell is in the inactive state, the presence of this terminal can then be detected on the basis of the second cell and thus can lead to the activation of the first cell in a pertinent manner, if appropriate.

The present invention provides an advantageous application in the context of an LTE type network.

The control entity can decide on a change to the activity state from an inactive state to an active state for the first cell, when the piece of presence information indicates that at least one terminal is present in the radio neighbouring area of the first cell.

By following this procedure, it is possible to provide radio coverage of the first cell whenever a terminal has a need for it.

The control entity can decide on a change to the activity state from an active state to an inactive state for the first cell, when the piece of presence information indicates that no terminal is present in the radio neighbouring area of the first cell.

Thus, as the first cell is deactivated when no terminal is present, the corresponding cell management entity as a result consumes less energy as soon as it is no longer capable of being useful.

The control entity can receive an indication of presence message, respectively an absence indication message, from a terminal detecting that it is entering into, respectively exiting from, the radio neighbouring area of the first cell.

Thus, the control entity can be informed of the presence or absence of at least one terminal in the radio neighbouring area of the first cell by the terminal(s) themselves, by processing these pieces of information received from the terminals.

The method implemented at a terminal according to an embodiment can be carried out both when the terminal is in an active state, and even when it is in a standby state.

It can in fact be envisaged that a terminal subscribed to the radio access of this first cell has available in advance a list of pieces of information relating to radio cells neighbouring the first cell (these pieces of information capable of being provided to it for example at the time of subscription to the access of this cell and capable of being updated by the network) and that it is in capable of determining if it is entering or leaving this radio neighbouring area of this first cell by comparing this list of pieces of information that it has available in advance with indications that it receives from one or more cells when it is located within the coverage of this cell or this plurality of cells. It is advantageous to provide that the indication of presence or absence of a terminal in the radio neighbouring area of the first cell originates from the terminal itself as it is conventionally in charge of carrying out radio measurements on the signal(s) received from the cells in which it is located.

In an embodiment of the present invention, the control entity is in charge of the control both of the first and the second cells, and the presence or absence indication message is transmitted by the terminal to this control entity.

It can also be provided for another control entity to be in charge of the control of the second cell, and that, in this case, the presence or absence indication message is transmitted by the terminal to this other control entity, this other control entity transmitting this indication message to the control entity in charge of the control of the first cell.

It should be made clear here that the term "control entity" does not in all cases denote an entity adapted for implementing the same functionalities. In fact, the control entity associated with the restricted access cell management entity is adapted for controlling the activity state of a restricted access cell, while a control entity controlling conventional cell management entities does not necessarily have this capability.

Moreover, the control entity associated with the restricted access cell management entity can be an entity dedicated to the control of the cell in question according to an embodiment of the present invention.

Thus, in the context of the present invention, a control entity can correspond to an entity of the core network or also to an entity dedicated to the control of cell activity according to an embodiment of the present invention.

A second aspect of the present invention proposes a method of control in a cellular network including:
  a first cell management entity adapted for managing a first radio cell which can be in an active state or in a inactive state;
  a second cell management entity adapted for managing at least one second radio cell; and
  at least one control entity adapted for controlling the first cell management entity;
  said first and second radio cells at least partially overlapping each other geographically;
  said method including the following steps at the first cell management entity:
  /1/receiving an activation message, respectively a deactivation message, from the control entity;
  /2/placing the first cell in an active state, respectively in an inactive state.

Thus, it is possible to optimize the energy consumption of the first cell management entity and to reduce the impact of this first cell on the other cells which are geographically nearby, and in particular on the second cell.

When the first cell is in an active state, a radio interface between a terminal and the first cell management entity allows the terminal to communicate, and, when the first cell is in a inactive state, the absence of a radio interface between a terminal and the first cell management entity does not allow the terminal to communicate.

Thus, when the first cell is inactive, it is possible to avoid the energy consumption associated with keeping the cell active, i.e. in particular associated with the transmission of radio signals such as that of the pilot channel of the cell.

When the first cell is in an active state, a communication is established between a base station managing the first cell and a network entity; and when the first cell is in an inactive state, no communication is established between this base station and the network entity.

It should be noted here that the control entity within the meaning of the present invention corresponds to implementing the control of the activity of a cell. To this end, it can be provided for this control entity to be situated anywhere within the architecture of the network in question. This control entity can for example be situated at the level of a network entity which manages the communications of the network terminals.

The same applies for the first cell management entity. Thus, this first cell management entity implements at least the steps corresponding to the control method according to an embodiment of the invention. However, it can moreover correspond to the base station managing the first cell or also be a separate entity from this base station.

Whatever the architecture of the network in question, here the purpose is to avoid the consumption of transmission resources linked to a communication which then proves needless between the base station and the network entity, when the first cell is in the inactive state.

A third aspect of the present invention proposes a method of controlling a terminal in a cellular network including:
 a first cell management entity adapted for managing a first radio cell which can be in an active state or in an inactive state;
 a second cell management entity adapted for managing at least one second radio cell; and
 at least one control entity adapted for controlling the first cell management entity;
said first and second radio cells at least partially overlapping each other geographically;
said method including the following steps at the terminal, said terminal having the availability of pieces of information relating to a radio neighbouring area of the first cell:
 /1/receiving a radio signal from at least one cell of the cellular network;
 /2/determining a piece of presence information indicating if the terminal is in the radio neighbouring area of the first cell on the basis of said pieces of information and of the received radio signal; and
 /3/transmitting to the control entity a message indicating said piece of presence information.

Here, the control entity can therefore manage a terminal presence context in a radio neighbouring area of the first cell with respect to which it can advantageously decide on an activity state of the first cell.

A fourth aspect of the present invention proposes a control entity adapted for implementing a control method according to the first aspect of the present invention.

A fifth aspect of the present invention proposes a cell management entity adapted for implementing a control method according to the second aspect of the present invention.

A sixth aspect of the present invention proposes a terminal adapted for implementing a control method according to the third aspect of the present invention.

A seventh aspect of the present invention proposes a cellular network including a control entity according to the fourth aspect of the present invention and a management entity according to the fifth aspect of the present invention adapted for a terminal according to the sixth aspect of the present invention.

BRIEF DESCRIPTION OF THE DRAWINGS

Other aspects, aims and advantages of the invention will become apparent on reading the description of one of its embodiments.

The invention will also be better understood with the help of the drawings, in which.

DETAILED DESCRIPTION

Figure 1:
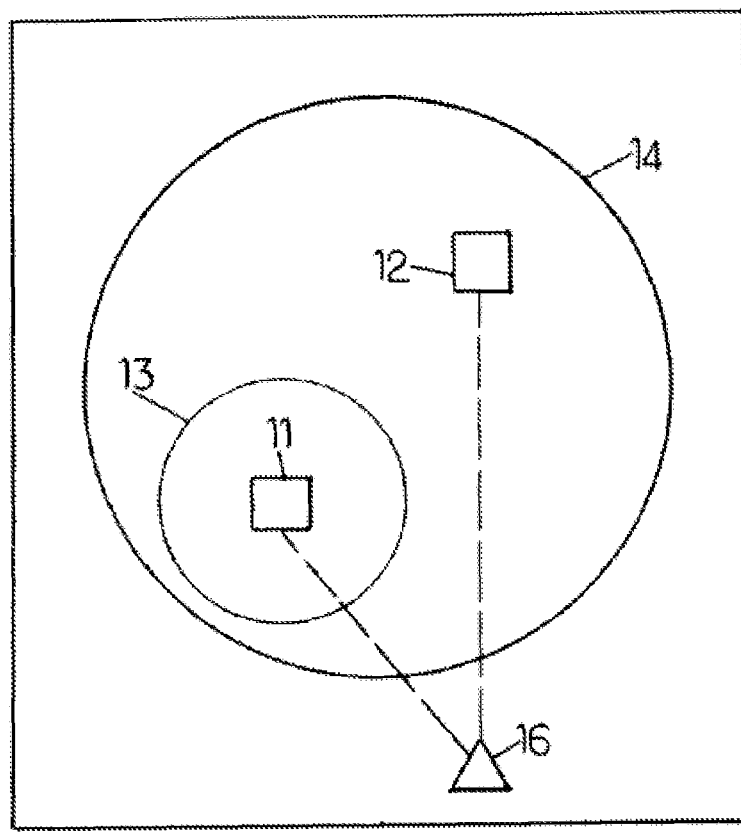
FIG. 1 shows a cellular network according to an embodiment of the prior art.

The present invention can easily be applied to any type of radio cell in a cellular network, providing that this cell covers a geographical area that is at least partially also covered by another cell of the cellular network. In this case, it is in fact possible according to an embodiment of the present invention to envisage controlling the activity of the cell on the basis of the presence or absence of at least one terminal in a radio neighbouring area of this cell.

Then, for the purposes of illustration of the present invention, the cell that it is proposed to activate or deactivate is of the "restricted access cell" type, i.e. a cell for which a restricted list of subscribers is authorized to access this cell. It should be noted however that this feature places no restriction on the possible different applications of the present invention. Thus, for the purposes of illustration only, the cell to be activated or deactivated is denoted by the term "restricted access cell", although this cell could also be an open access cell.

One of the purposes of the present invention is to control an activity state of a restricted access cell on the basis of the presence or absence of at least one mobile terminal close to, or within, the restricted access cell in question. The activity state of a restricted access cell within the activity context indicates if the restricted access cell is active or inactive. An active restricted access cell transmits radio messages in order to allow a radio communication to an authorized mobile terminal which may enter its area of radio coverage. On the other hand, a restricted access cell in the inactive state, or also standby state, does not transmit a radio message and therefore does not allow any communication to any mobile terminal present in its area of coverage.

In these conditions, provision can advantageously be made to keep a restricted access cell active provided that at least one of its subscriber terminals, i.e. one of the terminals which can access this restricted access cell, is situated close to said restricted access cell and, otherwise, to deactivate this cell. By proceeding in this way, it is possible to reduce the energy consumption associated with this restricted access cell. It is moreover possible to reduce the impacts of these restricted access cells on the neighbouring conventional cells by limiting in an appropriate manner the time periods during which these restricted access cells transmit radio signals, i.e. during which they are in an active state.

Provision is made to control the activity state of a restricted access cell at the network level in a cellular network according to an embodiment of the present invention. To this end, it can be provided that a control entity, in charge of the cell management entity which manages the restricted access cell in question, has available data relating to the current activity state of the restricted access cell or the restricted access cells for which it is responsible, as well as data relating to the presence or the absence, geographically close to the restricted access cell in question or also in said cell in question, of mobile terminals that are subscribed to this restricted access cell or cells.

The geographical proximity of a restricted access cell is referred to hereinafter using the term "radio neighbouring area" associated with a restricted access cell.

The data relating to the presence of mobile terminals in the radio neighbouring area of a restricted access cell can be stored in a presence context managed at the control entity and the activity state of each restricted access cell managed by the control entity can be stored in an activity context. Thus, on the basis of the presence and activity contexts managed at the control entity, the latter is capable of deciding on a change of activity state of a restricted access cell.

More specifically, in an embodiment of the present invention, the presence context of a mobile terminal can be updated on the basis of pieces of information received from this mobile terminal. In fact, to this end, it can be provided that a mobile terminal is adapted in order to determine if it is situated in a radio neighbouring area of a restricted access cell.

When it is situated in this radio neighbouring area, it can advantageously be provided to inform the control entity of this. More precisely, the mobile terminal can advantageously inform the control entity of a change of location in relation to the radio neighbouring area in question. Thus, when the terminal detects that it has just entered the radio neighbouring area, it can transmit a presence indication message to this control entity. Then, when it detects that it is exiting from this neighbouring area, it can then transmit an absence indication message to this same control entity.

On receiving this indication of presence or absence of a terminal in a radio neighbouring area, the control entity can then update the corresponding presence context. It can then compare this change in the presence context with the pieces of information stored in the activity context so as to decide if a change of activity state of the restricted access cell in question is required or not.

The activity context per restricted access cell indicates either that the restricted access cell is in an active state or that it is in an inactive state, i.e. the standby state.

In an embodiment of the present invention, the activity state of a restricted access cell is advantageously a function of the presence or absence of at least one mobile terminal in the radio neighbouring area of this restricted access cell.

It should be noted that a restricted access cell management entity can be in charge of the management of a plurality of restricted access cells, the latter being capable of being in different activity states.

It is then provided that, at the control entity in question, a step of activity updating is carried out when it is detected that certain conditions are fulfilled so that the restricted access cell changes activity state. During this step of activity updating, the control entity in question not only updates its new activity state in the activity context of this restricted access cell, but also initiates the actual change of said activity state of the restricted access cell.

Therefore an updating of this activity context corresponds either to a step of activation of the restricted access cell in question, or to a step of deactivation of said restricted access cell.

In an embodiment, the control entity decides on a change of activity state in the following two circumstances:

when a mobile terminal is indicated as present in the radio neighbouring area of the restricted access cell in question and this restricted access cell is inactive, then the activation of the latter is initiated;

when the only mobile terminal indicated as present in the radio neighbouring area leaves the latter and the restricted access cell is active, then the deactivation of this restricted access cell is initiated.

It is provided to initiate the inactive state by implementing a deactivation procedure of the restricted access cell. This deactivation procedure is preferably initiated when the presence contexts of the mobile terminals authorized to access the restricted access cell are all in the absent state in the presence context of the corresponding control entity.

It is provided to initiate the "active" state of a restricted access cell by implementing an activation procedure of the restricted access cell, including after its initial activation. Thus, the active state is the state preceding the inactive state of a restricted access cell.

This activation procedure is initiated when at least one of the mobile terminals authorized to access this restricted access cell is in the present state in the presence context managed by the control entity. Thus, the active state of a restricted access cell corresponds to the fact that there is at least one mobile terminal in the radio neighbouring area of the restricted access cell, on the one hand, and to the fact that the restricted access cell is in a active state on the other hand, i.e. that it transmits radio messages allowing a terminal to establish a communication and that it is linked to the control entity responsible for it.

The presence context contains data indicating a presence state per restricted access cell managed by the control entity and per subscriber mobile terminal. This presence state can either correspond to the "present" state when the mobile terminal is in the radio neighbouring area of the restricted access cell in question, or to the "absent" state when the latter is located outside this radio neighbouring area.

The more detailed implementation of the updating of the presence and activity contexts at the control entity in charge of a restricted access cell, and the procedures of activation and deactivation of this cell are detailed in following sections.

FIG. 1 shows a cellular network 15 according to an embodiment of the present invention. This cellular network 15 comprises a first cell management entity 11 having a first radio cell 13. This first radio cell can be intended to offer a radio coverage over a relatively limited geographical area, such as a delimited place of residence or also a business.

This telecommunications network 15 comprises moreover a second cell management entity 12 having a second radio cell 14. The second cell management entity 12 can correspond to a base station of a conventional cellular radio network such as an LTE.

It should be noted that the first and second radio cells 13 and 14 have a common geographical area of radio coverage, the respective areas of coverage overlapping each other at least partially. This feature makes it possible to activate the first cell 13 when the presence of a terminal is detected in this common geographical area.

Figure 2:
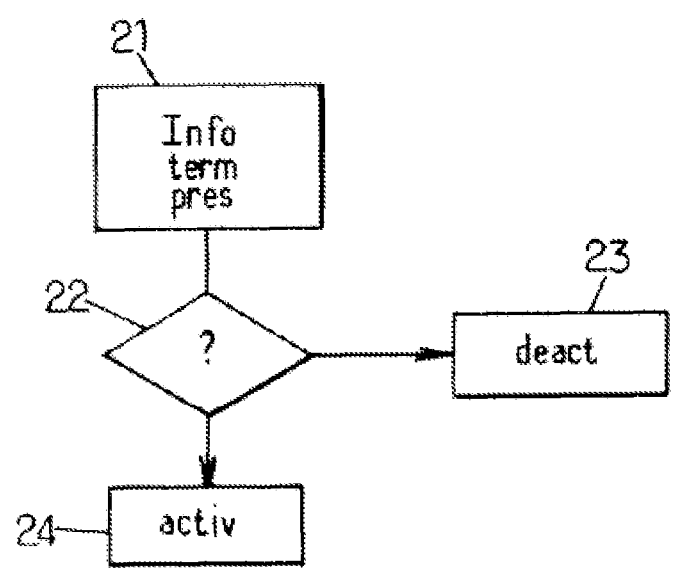
FIG. 2 shows the main steps of a control method according to an embodiment of the present invention at a control entity.

FIG. 2 shows the main steps of a control method according to an embodiment of the present invention at a control entity. In a step 21, the control entity 16 obtains a piece of presence information relating to the presence of at least one terminal in a radio neighbouring area of the restricted access cell 13. This information can be obtained from a presence context relating to all the mobile terminals subscribed to this restricted access cell. It indicates finally if at least one subscriber terminal is present or not in the area in question. Then, in a step 22, this piece of presence information is used as a basis in order to decide if the restricted access cell is activated in a step 24 or if it is deactivated in a step 23.

The detection of a change in the presence context can initiate a change of the activity of the cell in question. In an embodiment of the present invention, the presence context is modified on receiving an indication either of presence or of absence of a terminal. As a result, the mechanism for the control of activity of the cell according to an embodiment of the present invention is initiated on a action at the terminal.

In an embodiment of the present invention, the first cell management entity 11 is managed by a control entity 16. The latter can be an entity of the conventional cellular network to which the cell management entity 12 belongs.

It can be provided that said same control entity 16 is also in charge of the management of the second cell management entity 12. No limitation is attached to the present invention, as to whether the same control entity is in charge of the management of both cell management entities or not. It can in fact be envisaged that two different control entities can be in charge respectively of the two cell management entities 11 and 12.

In an embodiment of the present invention, a radio neighbouring area which corresponds to the radio coverage area of one or more neighbouring cells of a restricted access cell is defined in relation to this restricted access cell. This radio neighbouring area of a restricted access cell is a geographical area of reference for the position of a mobile terminal in relation to this restricted access cell, and more particularly for the management of the presence context.

No limitation is attached to the present invention with regard to the manner of determining such a radio neighbouring area with respect to a restricted access cell. It can in particular be provided that each mobile terminal according to an embodiment of the present invention is in charge of determining the neighbouring area(s) associated with each restricted access cell to which it has access. To this end, a list of pieces of information stored on their terminal can be provided to the subscribers of the restricted access cell in question, allowing them to identify, on the basis of an indication received via radio signals from the cells, if the terminal is in a radio neighbouring area of the restricted access cell in question.

The terminal then has access to data previously stored in memory which will allow it to determine if it is situated in a radio neighbouring area of a restricted access cell to which it has access. These previously stored data can be for example a list of identifiers of the neighbouring cells. When a terminal is present in a cell, the identifier of the cell is generally transmitted to it as system information of the cell.

Using such data, and on the basis of radio measurements carried out, it can then determine its presence in a radio neighbouring area and inform the control entity associated with the restricted access cell of this so as to adapt its activity state.

These radio measurements can be indicated to it in various ways and no limitation is attached to the present invention in this respect. Thus, it can be provided that these measurements are for example obtained from pieces of information received from the network, such as for example from the control entity.

It can be envisaged that the mobile terminal carries out an autonomous detection of these radio measurements, for example from pieces of information supplied by the neighbouring cells of the restricted access cell in question.

II is also possible to provide a dedicated reporting, between the first management entity to which the mobile terminal is attached and the mobile terminal, adapted for supplying information allowing a radio neighbouring area to be determined at the terminal. Thus, via such reporting, the mobile terminal can receive, in particular when it is in connected mode, a list of neighbouring cells of the restricted access cell supplied by the network, these radio neighbouring cells then constituting the radio neighbouring area associated with the restricted access cell in question.

It can be provided for the terminal to decide that it is in a radio neighbouring area of a restricted access cell as soon as it is simply capable of decoding the channel driver corresponding to at least one cell in the list of neighbouring cells.

It is possible to be more demanding in the terminal presence decision, by providing that a terminal is considered as present in a radio neighbouring area only if it is capable of carrying out a good quality communication in the cell in question. To this end, it is possible for example to define a threshold value for quality of service and a threshold value for signal power with respect to a signal in the cells indicated in the radio neighbouring area in question and it can then be provided for the terminal to decide on its presence in the radio neighbouring area if it receives a signal the power and the level of service quality of which are greater than said corresponding threshold values respectively.

The presence in a radio neighbouring area of a restricted access cell can be updated at the mobile terminal as soon as a new restricted access cell appears available or unavailable at the mobile terminal, whatever the criterion (criteria) of radio measurements that this mobile terminal uses in order to select a cell in the radio neighbouring area may be.

The restricted access cells can also be taken into account in the radio neighbouring area context, when the mobile terminal is authorized to access it and is also capable of accessing it.

In an embodiment, the "absent" state is initiated when the mobile terminal detects that it is exiting from the radio neighbouring area of the restricted access cell. This corresponds to the fact that the mobile terminal selects a radio cell, which can be either a restricted access cell or also a conventional cell, which does not belong to the radio neighbouring area registered by the mobile terminal in relation to the restricted access cell in question.

The "present" state is initiated when the mobile terminal detects that it is entering the radio neighbouring area of the restricted access cell in question. This corresponds to the fact that the mobile terminal selects a cell, which can be either a restricted access cell or also a conventional cell, which belongs to the radio neighbouring area registered by the terminal in relation to the restricted access cell in question.

On the basis of this presence state allocated to the terminal the control entity advantageously updates its presence context.

To this end, it can be provided to implement procedures at a mobile terminal in order to indicate the presence or absence of the mobile terminal in the radio neighbouring area of the restricted access cell. These indication procedures are intended to report at the level of the network the entry of a mobile terminal into a radio neighbouring area of a restricted access cell, respectively the exit of the mobile terminal from a radio neighbouring area of a restricted access cell.

In an embodiment of the present invention, it is provided to manage at the mobile terminal the detection of the entry or the exit of the mobile terminal of a radio neighbouring area, by using a presence bit associated with each restricted access cell to which this mobile terminal can gain access.

This presence bit can be set at the value 1 by implementing a presence indication procedure, and at the value 0 by implementing an absence indication procedure or also when the mobile terminal is powered off.

Thus, when the mobile terminal selects a cell which does not belong to the radio neighbouring area of a restricted access cell which it can access, it verifies the state of the presence bit of this restricted access cell. When it detects that a presence bit has the value 1, the mobile terminal then implements an absence indication procedure. When it detects that a presence bit has the value 0, then the mobile terminal can do nothing.

When the mobile terminal selects a cell which belongs to the radio neighbouring area of a restricted access cell to which it can gain access, it then verifies the state of the presence bit associated with this restricted access cell. If this presence bit has the value 0, the mobile terminal then implements a presence indication procedure. If this presence bit is at the value 1 then the mobile terminal can do nothing.

This presence bit is set at the value 0 for all the restricted access cells to which the mobile terminal has access, when the mobile terminal in question is powered off, by implementing an absence indication procedure.

After the mobile terminal has been powered up, if the cell selected by the mobile terminal forms part of the neighbouring context of a restricted access cell to which the terminal has access, the mobile terminal then implements a presence indication procedure.

The mobile terminal can therefore initiate the presence indication procedure when the cell selected by the mobile terminal forms part of the radio neighbouring area of a restricted access cell to which it has access, or when this selected cell is itself one of the restricted access cells to which it has access, and the presence bit of the mobile terminal in question is set at the value 0.

When the mobile terminal decides to initiate a presence indication procedure, it then constructs a presence message to the control entity in charge of the restricted access cell associated with the radio neighbouring area which is itself associated with the cell that the mobile terminal has just selected in order to informer the latter of its presence state.

This presence message can contain the following information:
  a global identifier of the restricted access cell;
  an identifier of the subscriber corresponding to the mobile terminal, this identifier making it possible to launch an authentication procedure, it can correspond to the identifier supplied temporarily by the network during the last location update of the mobile terminal.

This presence message can also moreover include an identifier of a group of restricted access cells to which the restricted access cell in question belongs. This information can be relevant in particular when an access control is carried out at the level of this group of restricted access cells. In fact, in this case, this information is required in order to verify that the subscriber mobile terminal is authorized to access this group of restricted access cells.

When the presence message used for the presence indication procedure and that used for the absence indication procedure have the same format, it is provided to indicate in this presence message, via a bit, if it is an entry into the radio neighbouring area or an exit from the radio neighbouring area of the restricted access cell in question for the mobile terminal.

Reciprocally, the mobile terminal decides to initiate the absence indication procedure when the selected cell does not form part of the radio neighbouring area of a restricted access cell to which it has access, and the presence bit of the mobile terminal associated with this radio neighbouring area is set at the value 1.

This procedure can also be initiated when the mobile terminal is powered off, such as for example before or during a procedure of detaching from the network. As indicated above, the presence bit is set at the value 0 in the case of powering off.

In the case where the mobile terminal initiates an absence indication procedure, it can transmit an absence message to the control entity in order to inform it of this state. It can provide in this message in particular the following elements:
  a global identifier of the restricted access cell;
  an identifier of the subscriber, making it possible to launch an authentication procedure, this identifier being capable of corresponding to the temporary identifier supplied by the network during the last location update of the mobile terminal in question.

This absence message can also indicate an identifier of a group of restricted access cells to which the restricted access cell in question belongs. In particular, if the access control is carried out at the level of the group of cells, this information can be required for verifying that the subscriber is authorized to access this group of restricted access cells.

This presence indication and/or absence indication procedure can be based on the use of messages already defined in the cellular network to which the management entity belongs. Thus, it can be provided to use as a basis the format of the existing location update procedures messages in the conventional cellular network, adding thereto the required pieces of information mentioned above.

In an embodiment of the present invention, the restricted access cell management entity exchanges pieces of information with the control entity which is in charge of its management. Such pieces of information correspond in particular to the implementation of an activation procedure of a restricted access cell, the latter being initiated if at least one mobile terminal is present in the presence context associated with the restricted access cell in question and if the restricted access cell is inactive in the activity context.

In the case where the cell management entity in charge of an inactive restricted access cell is the only restricted access cell managed by this cell management entity or if the other restricted access cells managed by this cell management entity are also inactive, then it is possible that no logical connection is in progress between this cell management entity and the responsible control entity.

In these conditions, the control entity can then transmit an activation message to the corresponding cell management entity in order to establish a logical connection with this cell management entity.

On receiving the activation message, the cell management entity arranges the establishment of the logical connection with the control entity and activates the restricted access cell in question, i.e. it transmits radio messages relating to this restricted access cell which allow mobile terminals to establish radio connections via the cell management entity.

Figure 3:
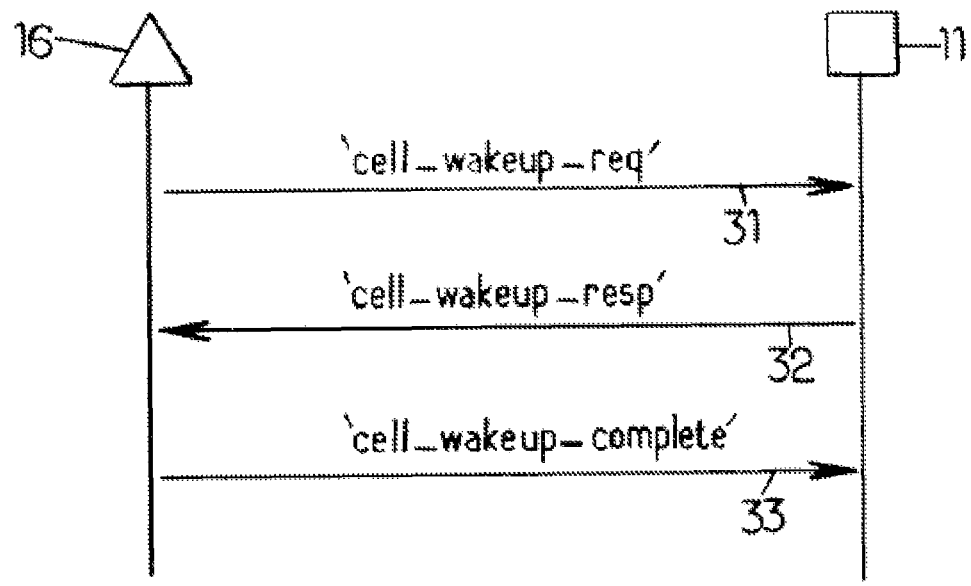
FIGS. 3 and 4 show a change of activity state procedure according to another embodiment of the present invention.

The activation procedure according to an embodiment of the present invention is detailed hereinafter with reference to FIG. 3.

A message "cell_wakeup_request" 31 requesting activation of the restricted access cell is transmitted by the control entity 16 to the cell management entity 11.

Then, a response message "cell_wakeup_response" 32 is sent by the cell management entity 11 to the control entity 16 in order to acknowledge receipt of the preceding message. This response message 32 indicates the pieces of information required for the establishment of a connection between the cell management entity 11 and the control entity 16.

Then, a confirmation message 33 "cell_wakeup_complete" is transmitted from the control entity 16 to the cell management entity 11 in order to confirm the implementation of the activation procedure.

The deactivation procedure of the restricted access cell is implemented when there is no terminal presence context for this restricted access cell in the present state, and when the restricted access cell in question is in the active state in the activity context.

In the case under consideration, the control entity 16 in charge of the cell management entity 11 of this restricted access cell can initiate dropping a logical connection between itself 16 and this cell management entity 11 if the latter is only managing this restricted access cell 13, or if the other restricted access cells managed by this cell management entity 11 are also in the inactive state. In this case, the cell management entity can then itself pass into a standby mode.

On receiving a deactivation message, the cell management entity 11 deactivates the restricted access cell in question, i.e. it stops the transmission of pieces of information from this cell over the radio interface, and no further radio connection with a mobile terminal can be established from this step.

Figure 4:
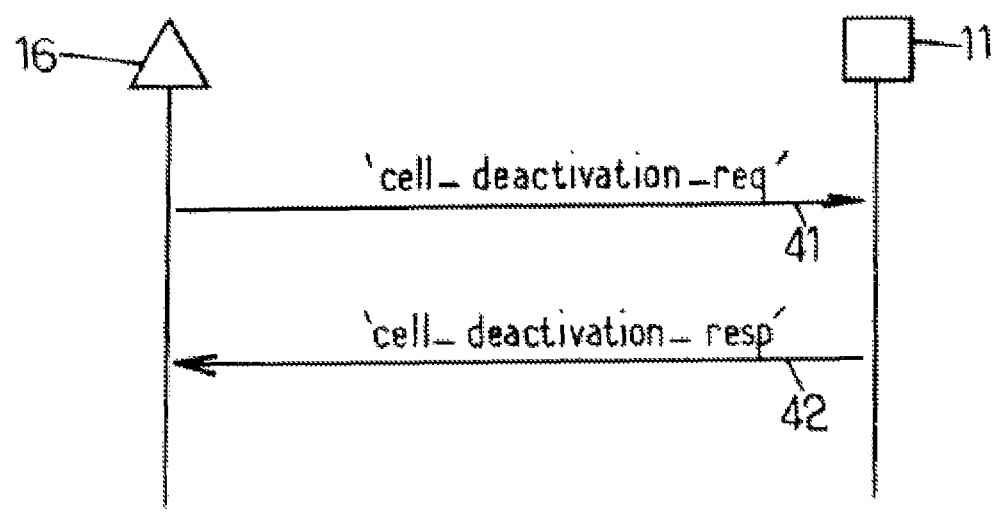

FIG. 4 shows a deactivation procedure.

A deactivation message 41 "cell_deactivation_request" is sent by the control entity 16 to the cell management entity 11 in order to deactivate the cell. On receiving this deactivation message at the cell management entity of the restricted access cell in question, the cell management entity stops the transmission of radio messages: the restricted access cell can therefore no longer accept any radio connection for a mobile terminal.

A response message 42 is transmitted from the cell management entity "cell_deactivation_response" in order to acknowledge the deactivation message from the control entity and indicate that the deactivation of the restricted access cell has been carried out.

At this stage, there is no longer any logical connection between the cell management entity 11 and the control entity 16 if all the restricted access cells managed by the cell management entity have been deactivated, and the state of the restricted access cell is inactive in the activity context of the control entity.

In an embodiment of the present invention, it is possible that the control entity 16 in charge of the management of the cell management entity 11 is an item of equipment different from the control entity(ies) which manage the other cell management entities, or base stations, in charge of the management of the cells belonging to the corresponding radio neighbouring area.

The terminal transmits a presence or absence indication message to the control entity in charge of the management of the management entity of the cell that it has just detected.

It is advantageous to define an information procedure allowing a control entity to inform another control entity of the entry or exit of a mobile terminal from the radio neighbouring area in question.

This can be carried out in several different ways.

It can for example be provided that this inter-control entity information procedure is carried out via a transfer of a message received from the mobile terminal, this message being capable of being transferred in a container message according to an inter-control entity communications protocol, also called an inter-node protocol. This solution can be advantageous with respect to transmission time considerations, since the transmitting control entity of the message then has no need to construct a message indicating identifiers of the restricted access cell, the mobile terminal, and even the group of restricted access cells if applicable. However, the message from the mobile terminal is analyzed by the control entity that receives it from the mobile terminal in order to determine to which control entity it should be transferred, i.e. which control entity manages the restricted access cell indicated in the message.

It can also be provided for the information procedure to be based on the transmission of pieces of information by the mobile terminal directly in a message according to an inter-node protocol. It is then possible to limit the overhead, as the identifiers supplied by the mobile terminal are already integrated with the inter-node protocol.

Figure 5:
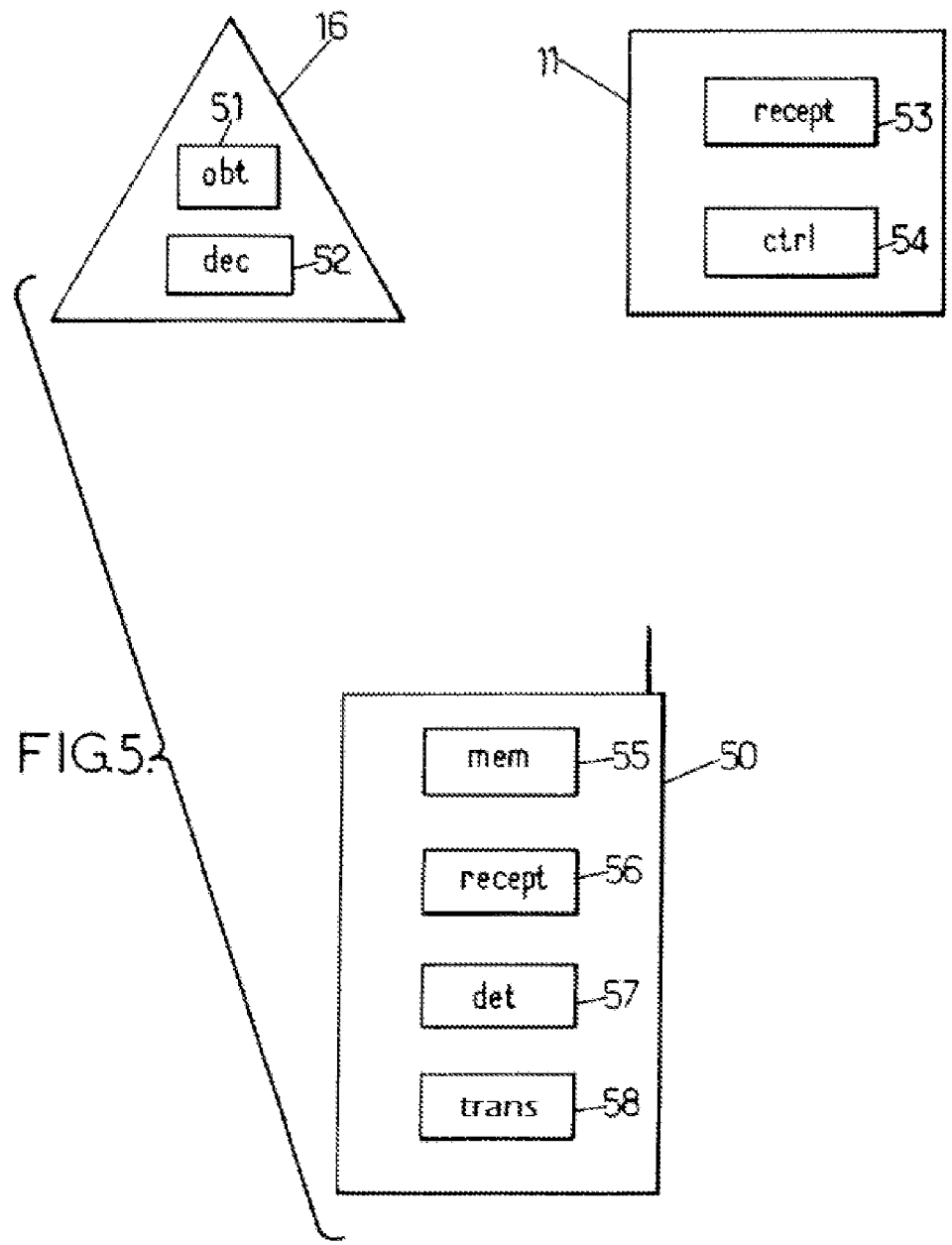
FIG. 5 shows a control entity, a cell management entity and a terminal according to an embodiment of the present invention.

FIG. 5 shows a control entity 16, a cell management entity 11 and a terminal according to an embodiment of the present invention.

A control entity 16 according to an embodiment of the present invention can include:
- an obtaining unit 51 adapted for obtaining a piece of presence information relating to the presence of at least one terminal in a radio neighbouring area of the first cell;
- decision unit 52 for deciding an activity state of the first cell on the basis of said piece of presence information.

A management entity 11 according to an embodiment of the present invention can include:
- a receiver 53 adapted for receiving an activation message, respectively a deactivation message, from the control entity 16; and
- a controller 54 adapted for placing the first cell in an active state, respectively in an inactive state.

A terminal 50 according to an embodiment of the present invention can include:
- a memory 55 storing pieces of information relating to a radio neighbouring area of the first cell;
- a receiver 56 adapted for receiving a radio signal from at least one cell;
- a determining unit 57 adapted for determining a piece of presence information indicating if the terminal is in the radio neighbouring area of the first cell on the basis of said pieces of information and of the radio signal received; and
- a transmitter 58 adapted for transmitting a message indicating said piece of presence information to the control entity 16.

The invention claimed is:

1. A control method in a cellular network comprising:
a first cell management entity adapted for managing a first radio cell which can be in an active state or in an inactive state;
a second cell management entity adapted for managing a second radio cell; and
a control entity adapted for controlling the first cell management entity;
said first and second radio cells overlapping each other geographically at least partially;
said method comprising the following steps at the control entity:
obtaining a piece of presence information relating to the presence of a terminal in a radio neighbouring area of the first cell;
deciding an activity state of the first cell on the basis of said piece of presence information;
receiving a presence indication message from a terminal that is entering into the radio neighbouring area of the first cell; and
receiving an absence indication message from a terminal that is exiting from the radio neighbouring area of the first cell, wherein said radio neighbouring area of the first cell comprising at least the second cell.

2. The control method according to claim 1, wherein the control entity decides on a change of activity state, from an inactive state to an active state for the first cell, when the piece of presence information indicates that at least one terminal is present in the radio neighbouring area of the first cell.

3. The control method according to claim 1, wherein the control entity decides on a change of activity state, from an active state to a inactive state for the first cell, when the piece of presence information indicates that no terminal is present in the radio neighbouring area of the first cell.

4. The control method according to claim 1, wherein:
the control entity is in charge of the control both of the first and the second cell, and
the presence or absence indication message is transmitted by the terminal to said control entity.

5. The control method according to claim 1, wherein:
another control entity is in charge of the control of the second cell, and
the presence or absence indication message is transmitted by the terminal to said other control entity, said other control entity transmitting said indication message to the control entity in charge of the management of the first cell.

6. A control method in a cellular network, the cellular network comprising:
a first cell management entity adapted for managing a first radio cell which can be in an active state or in an inactive state;
a second cell management entity adapted for managing a second radio cell; and
a control entity adapted for controlling the first cell management entity;
said first and second radio cells overlapping each other geographically at least partially;
said method comprising the following steps at the first cell management entity:
receiving an activation message, respectively a deactivation message, from the control entity;
placing the first cell in an active state, respectively in an inactive state; and
putting the first cell management entity in a stand-by mode if the first cell is in the inactivate state and no other cells are managed, or if all cells managed by the first cell management entity are in an inactive state.

7. The control method according to claim 6, wherein:
when the first cell is in an active state a radio interface between a terminal and the first cell management entity allows a communication from the terminal; and
when the first cell is in an inactive state no radio interface between a terminal and the first cell management entity allows a communication from the terminal.

8. The control method according to claim 7, wherein:
when the first cell is in an active state, a communication is established between a base station managing the first cell and a network entity; and
when the first cell is in an inactive state, no communication is established between said base station and the network entity.

9. A control method of a terminal in a cellular network, the cellular network comprising:
a first cell management entity adapted for managing a first radio cell which can be in an active state or in an inactive state;
a second cell management entity adapted for managing a second radio cell; and
a control entity adapted for controlling the first cell management entity;
said first and second radio cells overlapping each other geographically at least partially;
said method comprising the following steps at the terminal, said terminal having available pieces of information relating to a radio neighbouring area of the first cell:
receiving a radio signal from a cell of the cellular network;
determining a piece of presence information indicating if the terminal is in the radio neighbouring area of the first cell on the basis of said pieces of information and of the radio signal received;
transmitting to the control entity a message indicating said piece of presence information;
sending a presence indication message to the control entity when the terminal is entering into the radio neighbouring area of the first cell; and
sending an absence indication message to the control entity when the terminal that is exiting from the radio neighbouring area of the first cell.

10. A control entity in a cellular network, the cellular network comprising:
a first cell management entity adapted for managing a first radio cell which can be in an active state or in an inactive state;
a second cell management entity adapted for managing a second radio cell; and
a control entity adapted for controlling the first cell management entity;
said first and second radio cells overlapping each other geographically at least partially;
said control entity comprising:
an obtaining unit adapted for obtaining a piece of presence information relating to the presence a terminal in a radio neighbouring area of the first cell, adapted for obtaining a presence indication message from a terminal that is entering into the radio neighbouring area of the first cell, and adapted for obtaining an absence indication message from a terminal that is exiting from the radio neighbouring area of the first cell;
a decision unit for deciding an activity state of the first cell on the basis of said piece of presence information,
wherein said radio neighbouring area of the first cell comprising at least the second cell.

11. A cell management entity in a cellular network adapted for managing a first radio cell which can be in an active state or in an inactive state;
said cellular network comprising:
another cell management entity adapted for managing a second radio cell; and
a control entity adapted for controlling the cell management entity of the first radio cell;
said first and second radio cells overlapping each other geographically at least partially;
the cell management entity of the first cell comprising:
a receiver adapted for receiving an activation message, respectively a deactivation message, from the control entity; and
a controller adapted for placing the first cell in an active state, respectively an inactive state, and adapted for putting the first cell management entity in a stand-by mode if the first cell is in the inactivate state and no other cells are managed, or if all cells managed by the first cell management entity are in an inactive state.

12. A terminal adapted for operating in a cellular network, the cellular network comprising:
a first cell management entity adapted for managing a first radio cell which can be in an active state or in an inactive state;
a second cell management entity adapted for managing a second radio cell; and a control entity adapted for controlling the first cell management entity;
said first and second radio cells overlapping each other geographically at least partially;
said terminal comprising:
  a memory storing pieces of information relating to a radio neighbouring area of the first cell;
  a receiver adapted for receiving a radio signal from at least one cell;
  a determining unit adapted for determining a piece of presence information indicating if the terminal is in the radio neighbouring area of the first cell on the basis of said pieces of said information and of the radio signal received; and
  a transmitter adapted for transmitting a message indicating said piece of presence information to the control entity, adapted for transmitting a presence indication message to the control entity when the terminal is entering into the radio neighbouring area of the first cell, and adapted for transmitting an absence indication message to the control entity when the terminal that is exiting from the radio neighbouring area of the first cell.

13. A cellular network system comprising a cell management entity in a cellular network adapted for managing a first radio cell which can be in an active state or in an inactive state; said cellular network comprising:
  another cell management entity adapted for managing a second radio cell; and
  a control entity adapted for controlling the cell management entity of the first radio cell;
  said first and second radio cells overlapping each other geographically at least partially;
  the cell management entity of the first cell comprising:
    a receiver adapted for receiving an activation message, respectively a deactivation message, from the control entity; and
    a controller adapted for placing the first cell in an active state, respectively an inactive state;
  a control entity in a cellular network comprising:
  a first cell management entity adapted for managing a first radio cell which can be in an active state or in an inactive state;
  a second cell management entity adapted for managing a second radio cell; and
  a control entity adapted for controlling the first cell management entity;
  said first and second radio cells overlapping each other geographically at least partially;
  said control entity comprising:
    an obtaining unit adapted for obtaining a piece of presence information relating to the presence of a terminal in a radio neighbouring area of the first cell, adapted for obtaining a presence indication message from a terminal that is entering into the radio neighbouring area of the first cell, and adapted for obtaining an absence indication message from a terminal that is exiting from the radio neighbouring area of the first cell;
    a decision unit for deciding an activity state of the first cell on the basis of said piece of presence information,
  wherein said radio neighbouring area of the first cell comprising at least the second cell.

14. A non-transitory computer readable medium having computer instructions recorded thereon, the computer instructions configured to perform a control method in a cellular network, the cellular network comprising:
  a first cell management entity adapted for managing a first radio cell which can be in an active state or in an inactive state;
  a second cell management entity adapted for managing a second radio cell; and
  a control entity adapted for controlling the first cell management entity;
  said first and second radio cells overlapping each other geographically at least partially;
  said method comprising the following steps at the control entity:
    obtaining a piece of presence information relating to the presence of a terminal in a radio neighbouring area of the first cell;
    deciding an activity state of the first cell on the basis of said piece of presence information;
    receiving a presence indication message from a terminal that is entering into the radio neighbouring area of the first cell; and
    receiving an absence indication message from a terminal that is exiting from the radio neighbouring area of the first cell,
  said radio neighbouring area of the first cell comprising at least the second cell.

15. A non-transitory computer readable medium having computer instructions recorded thereon, the computer instructions configured to perform a control method in a cellular network, the cellular network comprising:
  a first cell management entity adapted for managing a first radio cell which can be in an active state or in an inactive state;
  a second cell management entity adapted for managing a second radio cell; and
  a control entity adapted for controlling the first cell management entity;
  said first and second radio cells overlapping each other geographically at least partially;
  said method comprising the following steps at the first cell management entity:
    receiving an activation message, respectively a deactivation message, from the control entity;
    placing the first cell in an active state, respectively in an inactive state; and
    putting the first cell management entity in a stand-by mode if the first cell is in the inactivate state and no other cells are managed, or if all cells managed by the first cell management entity are in an inactive state.

* * * * *